J. L. MASON.
FRUIT-JAR.

No. 189,316. Patented April 10, 1877.

Witnesses
L. F. Brous.
A. P. Grant.

Inventor
John L. Mason,
by John A. Biedenstein.
Att'y

UNITED STATES PATENT OFFICE.

JOHN L. MASON, OF NEW BRUNSWICK, NEW JERSEY.

IMPROVEMENT IN FRUIT-JARS.

Specification forming part of Letters Patent No. 189,316, dated April 10, 1877; application filed December 30, 1876.

*To all whom it may concern:*

Be it known that I, JOHN L. MASON, of New Brunswick, in the county of Middlesex and State of New Jersey, have invented a new and useful Improvement in Fruit or Preserve Jars; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
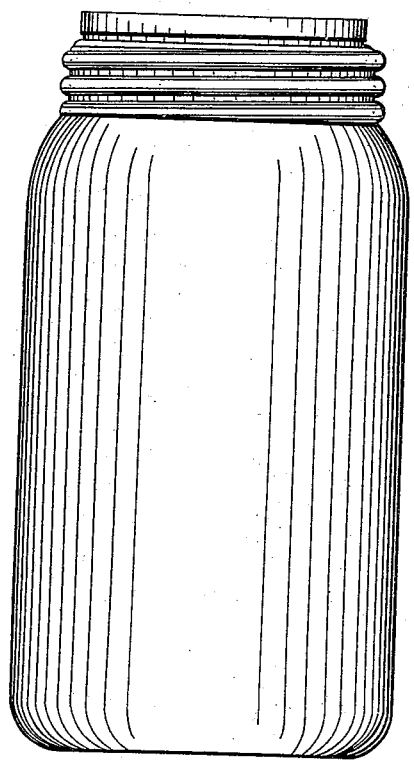
Figure 2:
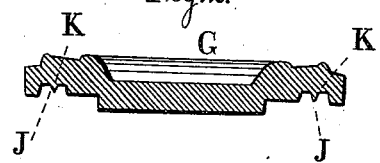
Figure 3:
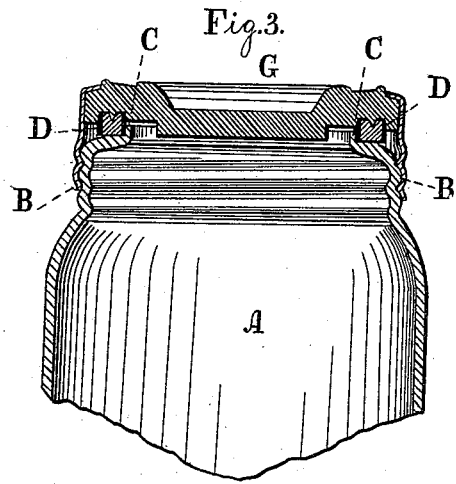

Figure 1 is a side elevation of the device embodying my invention. Fig. 2 is a central vertical section of the top or cover. Fig. 3 is a central vertical section of a portion of Fig. 1.

Similar letters of reference indicate corresponding parts in the several figures.

My invention consists in a preserve-jar cover having on its under side, near the circumference thereof, a wedge-shaped channel, from the base of which projects downwardly a rib, in combination with a gasket, which encircles the top flange of the body of an ordinary screw-neck preserve-jar, and projects above said flange, whereby, when the cap or lock is screwed on the body, the gasket is compressed vertically and expanded laterally, the wedge shape of the channel increasing the space for the occupation of the expanded gasket, and the rib increasing the lateral expansion of the gasket, so that the wedging-channel will be entirely filled by the gasket in an expanded state without solidification, the gasket isolated from the contents of the jar, and the joint between the cover and body of the jar made tight and serviceable.

Referring to the drawings, A represents the body of a fruit or preserve jar; B, the screw-neck, and C the top flange thereof. D represents a gasket, which is laid on the top of the neck B, and, encircling the flange C, projects above the latter. G represents a cover or stopper, which is held to the jar by means of the screw cap or lock, H. On the under side of the cover is formed a channel, J, which is of tapering or wedging form, the widest part being below, and on the same side of the cover there is also formed a rib, K, which projects into the channel J.

When the gasket is properly located and the cover G placed in position thereon, the top of the top of the gasket projects into the channel J, as seen in Fig. 3.

When the screw cap or lock is fitted on the jar and tightened the gasket will be compressed, and thus expanded, whereby the channel J, being of wedging form, will be entirely filled by the gasket, and thus the joint will be tight and serviceable.

This operation will be assisted by the action of the rib K, which will serve to further expand the top of the gasket in the narrowest part of the channel J.

It will be seen that the two sides or walls and base of the channel will have the gasket firmly compressed thereagainst, whereby the reliable sealing of the jar is insured.

I am aware that it is not new to form on the under side of the cover of the jar a rib or thread which bears against the gasket below the top of the flange of the body of the jar. I am also aware that it is not new to specially construct a jar with a V-shaped groove on its upper face.

By my invention I overcome the defect of the former case, wherein the gasket has no space to expand, and it becomes solid, thus limiting the downward motion of the cap or cover.

In the other case the gasket will expand and spread horizontally in the joint between the cover and top edge of the body, and at the same time the gasket will come in contact with the fruit. Moreover, the jar has to be specially constructed; but I employ the well-known screw-neck jar having a top flange.

Having thus described my invention, what I claim as new, and desire to secure by Letters Patent, is—

The cover G, having on its under side the wedge-shaped channel J, and the rib K projecting thereinto, in combination with the gasket D, encircling the top flange C of the jar, and projecting above said flange, all constructed, arranged, and operating substantially as and for the purpose set forth.

JOHN L. MASON.

Witnesses:
 JOHN A. WIEDERSHEIM,
 A. P. GRANT.